US010921983B2

(12) United States Patent
Naranjo et al.

(10) Patent No.: US 10,921,983 B2
(45) Date of Patent: Feb. 16, 2021

(54) TOOLBAR DASHBOARD FUNCTIONALITY

(71) Applicant: Microsoft Technology Licensing, LLC, Redmond, WA (US)

(72) Inventors: Felipe Luis Naranjo, Seattle, WA (US); Wissam Kazan, Redmond, WA (US); Kevin Michael Babbitt, Sammamish, WA (US); Russell Scott Randall, Seattle, WA (US); Daniel Gwozdz, Fall City, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/572,941

(22) Filed: Sep. 17, 2019

(65) Prior Publication Data

US 2020/0012426 A1 Jan. 9, 2020

Related U.S. Application Data

(63) Continuation of application No. 14/880,847, filed on Oct. 12, 2015, now Pat. No. 10,444,986, which is a
(Continued)

(51) Int. Cl.
*G06F 3/048* (2013.01)
*G06F 3/0488* (2013.01)
*G06F 21/54* (2013.01)
*G06F 9/451* (2018.01)
*G06F 3/0483* (2013.01)
(Continued)

(52) U.S. Cl.
CPC .......... *G06F 3/04886* (2013.01); *G06F 3/048* (2013.01); *G06F 3/0483* (2013.01); *G06F 3/04842* (2013.01); *G06F 9/451* (2018.02); *G06F 21/54* (2013.01); *H04L 51/32* (2013.01); *H04L 63/08* (2013.01); *H04L 67/02* (2013.01)

(58) Field of Classification Search
CPC .................. G06F 3/04842; G06F 3/04886
See application file for complete search history.

(56) References Cited

U.S. PATENT DOCUMENTS 5,696,533 A * 12/1997 Montgomery ...... G06F 3/04842
345/545
9,189,122 B2 11/2015 Naranjo et al.
(Continued)

OTHER PUBLICATIONS

"Office Action for U.S. Appl. No. 12/394,044", dated Apr. 5, 2011, 23 pages.
(Continued)

*Primary Examiner* — Claudia Dragoescu
(74) *Attorney, Agent, or Firm* — Medley, Behrens & Lewis, LLC

(57) ABSTRACT

A system described herein includes a receiver component that receives an indication that a user has selected a first selectable buttontab in a toolbar installed in a client application. The system further includes a display component that causes a dashboard to be displayed on a display device in response to receipt of the indication that the user has selected the buttontab. The dashboard includes a content window that displays content and the buttontab, wherein the dashboard is a seamless visual combination of the buttontab and the content window.

20 Claims, 15 Drawing Sheets

Related U.S. Application Data continuation of application No. 12/394,044, filed on Feb. 27, 2009, now Pat. No. 9,189,122.

(51) Int. Cl.
*G06F 3/0484* (2013.01)
*H04L 12/58* (2006.01)
*H04L 29/06* (2006.01)
*H04L 29/08* (2006.01)

(56) References Cited

U.S. PATENT DOCUMENTS

| | | | |
|---|---|---|---|
| 2002/0186249 | A1 | 12/2002 | Lu et al. |
| 2006/0015818 | A1 | 1/2006 | Chaudhri et al. |
| 2006/0230272 | A1* | 10/2006 | Lawrence ............ H04L 63/126 713/176 |
| 2007/0157118 | A1* | 7/2007 | Wuttke ................ G06F 16/957 715/810 |
| 2008/0046841 | A1* | 2/2008 | Ridl .................... G06F 3/0486 715/843 |
| 2008/0094369 | A1 | 4/2008 | Ganatra et al. |
| 2009/0144392 | A1* | 6/2009 | Wang .................. H04L 67/306 709/217 |
| 2009/0320105 | A1* | 12/2009 | Jurkiewicz ............ H04L 67/02 726/5 |
| 2010/0223664 | A1 | 9/2010 | Naranjo et al. |
| 2016/0034182 | A1 | 2/2016 | Naranjo et al. |

OTHER PUBLICATIONS

"Response to the Office Action for U.S. Appl. No. 12/394,044", Filed Date: Sep. 2, 2011, 18 pages.

"Office Action for U.S. Appl. No. 12/394,044", dated Oct. 25, 2011, 22 pages.

"Response to the Office Action for U.S. Appl. No. 12/394,044", Filed Date: Feb. 23, 2012, 19 pages.

Perry, G., "Sams Teach Yourself Microsoft Windows XP in 24 Hours", 2001, Sams, p. 82.

"Final Office Action for U.S. Appl. No. 12/394,044", dated Jul. 5, 2012, 24 pages.

"Response to the Final Office Action for U.S. Appl. No. 12/394,044", Filed Date: Nov. 5, 2012, 10 pages.

"Office Action for U.S. Appl. No. 12/394,044", dated May 2, 2013, 25 pages.

"Response to the Office Action for U.S. Appl. No. 12/394,044", Filed Date: Oct. 2, 2013, 14 pages.

"Final Office Action for U.S. Appl. No. 12/394,044", dated Nov. 14, 2013, 12 pages.

"Final Office Action for U.S. Appl. No. 12/394,044", dated Apr. 24, 2014, 29 pages.

"Response to the Final Office Action for U.S. Appl. No. 12/394,044", Filed Date: Oct. 24, 2014, 17 pages.

"Office Action for U.S. Appl. No. 12/394,044", dated Dec. 31, 2014, 31 pages.

"Response to the Office Action for U.S. Appl. No. 12/394,044", Filed Date: Jun. 2, 2015, 13 pages.

"Notice of Allowance and Fees Due for U.S. Appl. No. 12/394,044", dated Jun. 29, 2015, 10 pages.

"Office Action for U.S. Appl. No. 14/880,847", dated Feb. 14, 2018, 17 pages.

"Response to the Office Action for U.S. Appl. No. 14/880,847", Filed Date: Aug. 14, 2018, 12 pages.

"Final Office Action for U.S. Appl. No. 14/880,847", dated Oct. 11, 2018, 20 pages.

"Response to the Final Office Action for U.S. Appl. No. 14/880,847", Filed Date: Apr. 10, 2019, 13 pages.

"Notice of Allowance and Fees Due for U.S. Appl. No. 14/880,847", dated Jun. 5, 2019, 9 pages.

* cited by examiner

TOOLBAR DASHBOARD FUNCTIONALITY

CROSS-REFERENCE TO RELATED APPLICATIONS

This application is a continuation of U.S. patent application Ser. No. 14/880,847, filed on Oct. 12, 2015, and entitled "TOOLBAR DASHBOARD FUNCTIONALITY", which is a continuation of U.S. Pat. No. 9,189,122, filed on Feb. 27, 2009, and entitled "TOOLBAR DASHBOARD FUNCTIONALITY". The entireties of these applications are incorporated herein by reference.

BACKGROUND

Modern personal computers can be equipped with a multitude of applications that facilitate performance of a variety of tasks including but not limited to word processing tasks, generation of one or more spreadsheets, photo editing, instant messaging, Internet browsing, amongst others. In many of these applications, specialized toolbars can be installed. Pursuant to an example, a toolbar can be downloaded by way of the Internet and installed in an Internet browser. Once installed, the toolbar can allow a user to quickly obtain access to one or more web sites or services. For instance, the toolbar may be displayed in a framespace of the Internet browser and may include a plurality of selectable buttons.

Typically, selection of one of the buttons in the toolbar causes a new browser window or tab to be opened, wherein the browser window or tab is directed to a certain site corresponding to the selected toolbar button. In some instances, however, it may be inconvenient for the user to have a new browser window presented over an existing browser window and/or to have the browser navigate away from a web page that is currently being perused by the user.

In addition, some toolbars may be configured with one or more selectable buttons that when selected, direct the user to a web page that requests user credentials (e.g., user name and password). Once the user has provided such credentials and the credentials have been verified, the toolbar can be customized in accordance with predefined preferences of the user. Thus, type of buttons and arrangement of buttons may be displayed in the toolbar in accordance with predefined user preferences. Again, however, requiring the user to navigate to a new page to provide sign-in credentials may be inconvenient to the user. Furthermore, requesting user credentials in such a manner may leave the user susceptible to a phishing attack. For instance, a sophisticated hacker may create a graphical user interface that looks substantially similar to a graphical user interface used by the intended recipient of the user credentials. Thus, a user may unknowingly provide their credentials to malicious source.

SUMMARY

The following is a brief summary of subject matter that is described in greater detail herein. This summary is not intended to be limiting as to the scope of the claims.

Various technologies pertaining to a toolbar application that can be installed in a client-side application such as a word processing application, a spreadsheet application, an Internet browser, etc. are described in greater detail herein. In an example, the toolbar application can be a graphical user interface application that includes a selectable buttontab. Upon selection of the buttontab (e.g., through use of a pointing and clicking mechanism), a dashboard can be graphically displayed to a user on a display screen of a computing device. A dashboard can be visually depicted as a visually seamless combination with a buttontab and a content window. That is, a buttontab and the content window are graphically depicted in a visually seamless manner. Pursuant to an example, at least a portion of the dashboard may be displayed over a viewing/editing area of the client application (e.g., outside of the framespace of an Internet browser and over a viewing area of the browser).

In an example, the buttontab in a toolbar may be configured to receive user credentials from a user. When the user selects the buttontab, a dashboard can be graphically displayed to the user, wherein the content window of the dashboard includes one or more fields for receiving user credentials. As the dashboard is graphically depicted as a seamless combination of the buttontab and the content window, a malicious hacker attempting to phish for user credentials would have difficulty generating a graphical user interface that mimics a graphically depicted dashboard. Specifically, as the dashboard is a seamless combination of the buttontab and the content window and extends in the viewing area of the client application, a hacker would have difficulty generating a graphical equivalent of such seamless combination as it exists in the framespace of a client application.

Still further, when the buttontab corresponding to receiving user credentials is selected by a user, a certificate of a site that is to receive such user credentials can be analyzed. If the certificate is verified, a graphical indicator can be presented in the toolbar to inform a user that they can safely provide their credentials. For instance, a color of at least a portion of the toolbar can change (e.g., to green). In another example, another graphical indicator may be presented to the user to indicate that a certificate of the site receiving the user credentials has been verified (such as a graphical icon of a lock). Still further, if the site certificate is not verified, the toolbar can present a graphical indication to the user such as turning red.

The example toolbar described herein can also include numerous other buttontabs, wherein the buttontabs may operate differently when hovered over or selected depending on whether or not the user has provided valid user credentials. For instance, if the user has not provided user credentials, the buttontabs can appear as buttons when hovered over by a pointing and clicking mechanism. Furthermore, when selected, the buttontabs can cause a new browser window or browser tab to be opened and directed towards a web site corresponding to the selected buttontab. In another example, selection of a buttontab may cause a browser to be redirected to a web site corresponding to the buttontab.

If the user has provided user credentials, the buttontab may be presented as a selectable tab (upside down "U" shaped) when a pointing and clicking mechanism is hovered over the buttontab. If a buttontab is selected, a dashboard corresponding to the buttontab may be displayed, wherein the dashboard is a seamless combination of the selected buttontab and a content window. For instance, if the buttontab pertains to e-mail, the content window of a dashboard can provide a user with a snapshot view of contents of the user's e-mail inbox without requiring the user to direct the browser to a different web page or open a new browser window. Other buttontabs described herein may correspond to calendar data, photographs, news items, sharing data, a profile of the user, and/or other social networking data.

Other aspects will be appreciated upon reading and understanding the attached figures and description.

DETAILED DESCRIPTION

Figure 1:
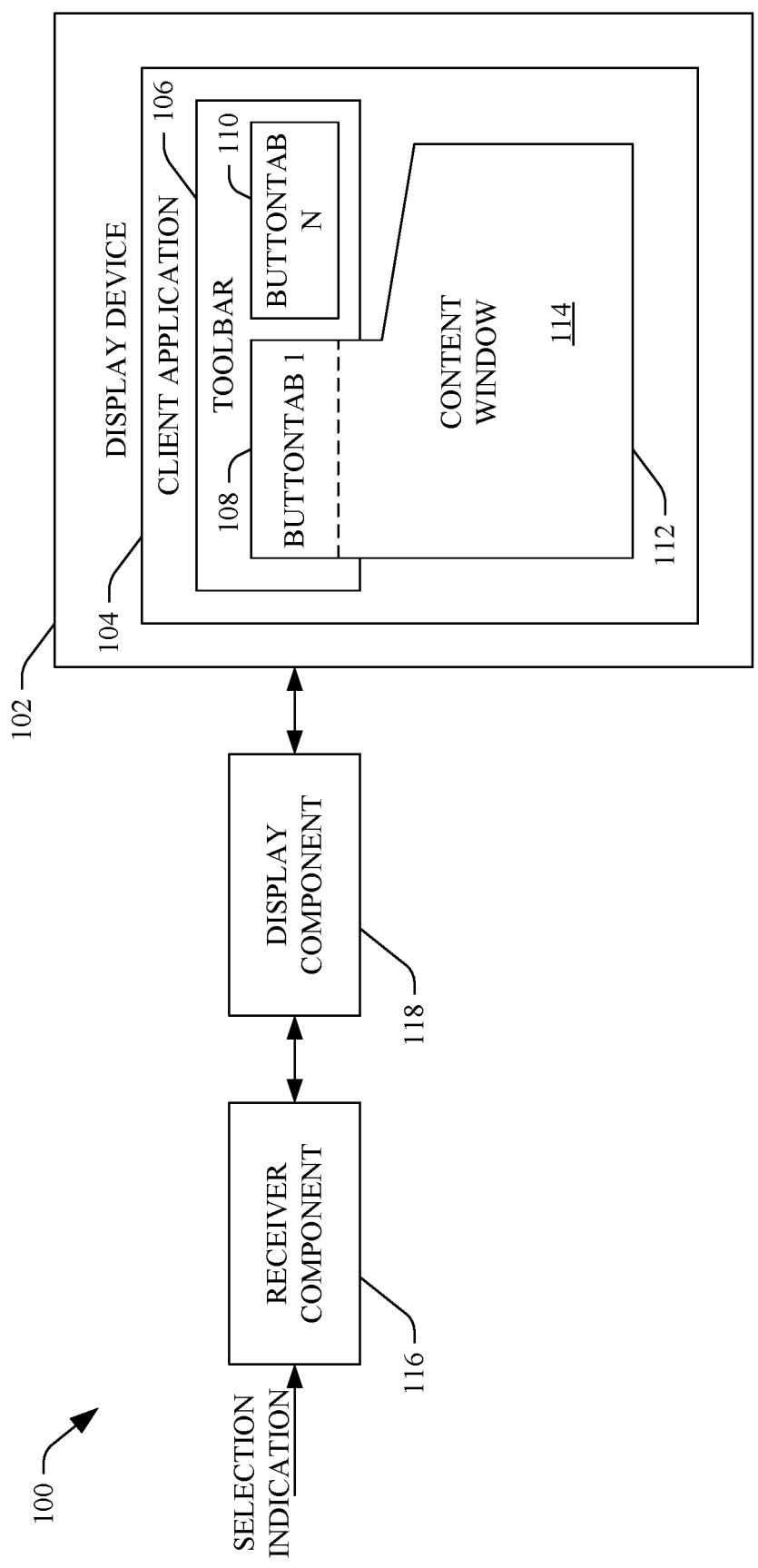
FIG. 1 is a functional block diagram of an example system that facilitates displaying a dashboard in a client application through use of a toolbar.

Various technologies pertaining to dashboards that can be displayed from toolbars installed in a client application will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates displaying a dashboard from a toolbar installed in a client application is illustrated. The system 100 includes a display device 102 that may exist on a client computer such as a personal computer, a personal digital assistant, a mobile telephone, a laptop computer, etc. Thus, the display device 102 may be or include a liquid crystal display screen, a cathode ray tube display screen or other suitable display screen. The display device 102 may display a graphical user interface pertaining to a client application 104 to a user. The client application 104 may be, for instance, an Internet browser, a word processing application, a spreadsheet application, a slideshow application, or any other suitable application that can be executed on the client computing device.

The client application 104 may include a toolbar 106, which may be an add-on or plug-in application to the client application 104. For example, the toolbar 106 may be a search toolbar that is downloaded to the client computing device by way of the Internet and installed in the client application 104, which may be an Internet browser.

The toolbar 106 can include a plurality of selectable buttontabs 108-110. As will be described in greater detail below, functionality of the plurality of buttontabs 108-110 may depend on whether or not the user has provided valid user credentials (e.g., user name and password) to the toolbar 106. Pursuant to an example, upon selection of the buttontab 108 a dashboard 112 can be visually presented to the user on the display device 102. As used herein, a dashboard can be a visually seamless combination of a buttontab and a content window 114, wherein the content window 114 displays information pertaining to the buttontab selected by the user. For instance the buttontab 108 may pertain to e-mail, and the content window 114 can display at least a portion of an e-mail inbox of the user upon the buttontab 108 being selected.

The system 100 may also include a receiver component 116 that receives an indication that the user has selected the first buttontab 108 in the toolbar 106 installed in the client application 104. For instance, the user may select the first buttontab 108 through use of a pointing and clicking mechanism such as a mouse. The system 100 may also include a display component 118 that causes the dashboard 112 to be displayed on the display device 102 in response to receipt of the indication that the user has selected the first buttontab 108. As noted above, the dashboard 112 is a visually seamless combination of the buttontab 108 and the content window 114.

As will be shown and described in greater detail below, the toolbar 106 can include a plurality of different types of buttontabs. For instance, the toolbar 106 may include a buttontab pertaining to receipt of user credentials, pertaining to user e-mail, pertaining to photographs (e.g., taken by the user and/or posted by contacts in the user's social network), a buttontab pertaining to calendar data, a buttontab pertaining to uploading data to a web site that can be viewed by contacts in the user's social network, a buttontab pertaining to a profile of the user, a buttontab pertaining to news, amongst other buttontabs. Thus, the display component 118 can be configured to display dashboards pertaining to each of the buttontabs upon receiving an indication that the user has selected one of such buttontabs. Furthermore, the display component 118 can graphically modify the toolbar 106 when content of a dashboard has changed, when a reminder is to be issued to a user, when certificates of a site that receives user credentials has been authorized, etc.

Figure 2:
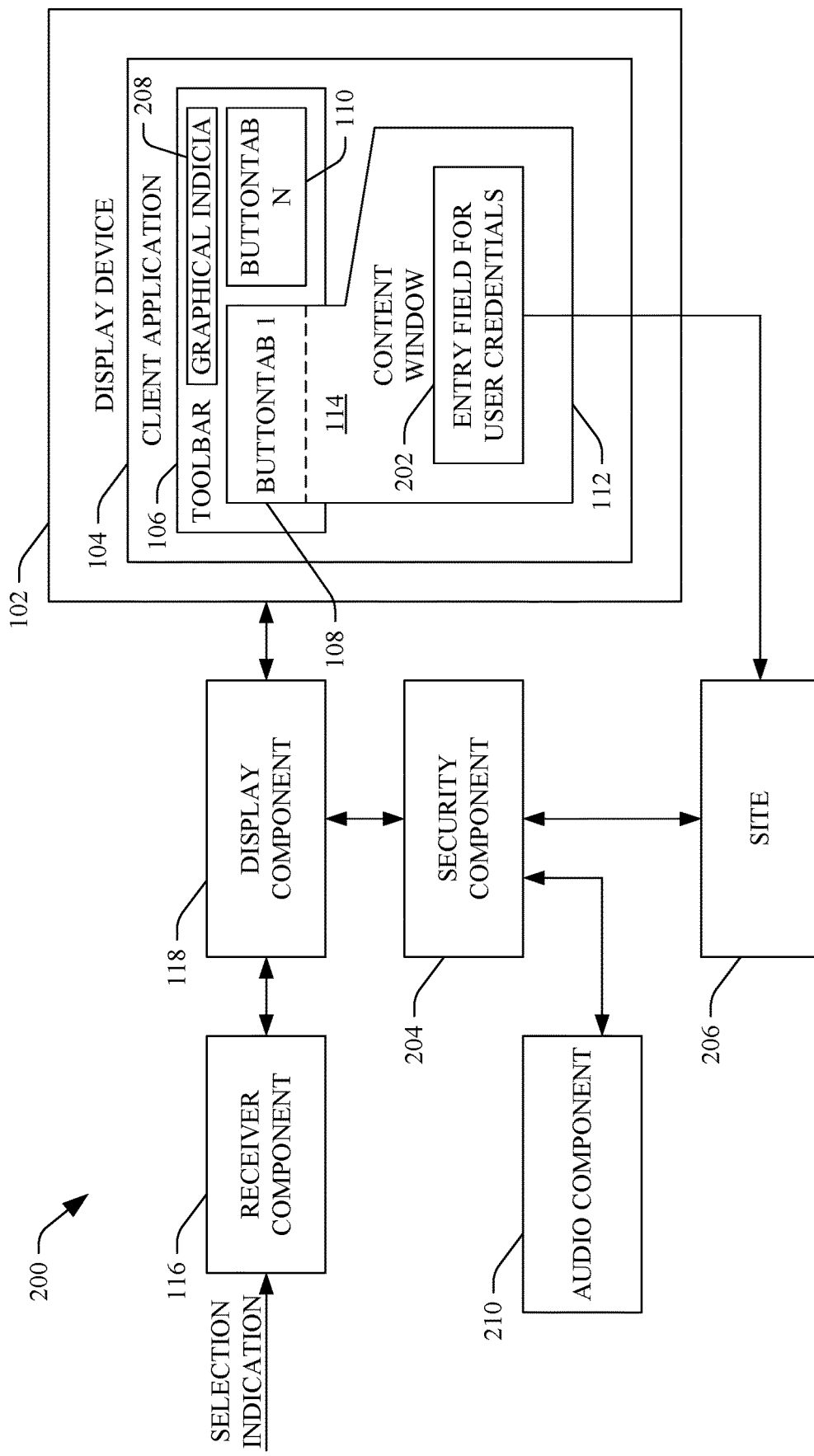
FIG. 2 is a functional block diagram of an example system that facilitates receiving user credentials by way of a dashboard in a toolbar.

Referring now to FIG. 2, an example system 200 that facilitates informing a user that a site that is to receive user credentials is associated with valid certificates is illustrated. The system 200 includes the display device 102, the client application 104, and the toolbar 106. Additionally, the toolbar 106 includes the selectable buttontabs 108-110. Furthermore, the system 200 includes the receiver component 116 and the display component 118 which can act in conjunction as described above.

In this example, the user has selected the first buttontab 108 which pertains to allowing a user to sign in to the toolbar 106. Upon receipt of an indication that the user has selected the first buttontab 108, the display component 118 can cause the dashboard 112 to be displayed in the client application 104 on the display device 102. The content window 114 can include at least entry field for receiving user credentials 202. For instance, the entry field(s) for receiving user credentials 202 can be configured to receive a user name and/or password.

The system 200 may further include a security component 204, wherein the security component 204 can access one or more certificates of a site 206 (web site) that is to receive user credentials entered by way of the entry field(s) for user credentials 202. Pursuant to an example, the security component 204 can access these certificates upon the receiver component 116 receiving an indication that the user has selected the buttontab 108. If the security component 204 finds that certificates of the site 206 are valid, the security component 204 can output an indication that such certificates are valid. The display component 118 can receive the indication from the security component 204 that the certificates are valid, and can cause a graphical indicia 208 to be displayed on the toolbar 106 to indicate to the user that the one or more certificates pertaining to the site 206 are valid.

For instance, the display component 118 can cause at least a portion of the toolbar 106 to change color. In a specific example, the display component 118 can cause the toolbar 106 to turn green if the security component 204 indicates that the certificates pertaining to the site 206 are valid. In another example, the display component 118 can cause a graphical icon to appear on the toolbar 106, such as a graphical icon of a lock to indicate that the certificates pertaining to the site 206 have been found to be valid and that the user can enter their user credentials into the entry field(s) for user credentials 202 with confidence. In yet another example, the display component 118 can cause animation to appear in the toolbar 106 to indicate to the user that the user can enter their user credentials into the entry field(s) for user credentials 202 with confidence. In still yet another example, the system 200 may include an audio component 210 that is in communication with the security component 204. For instance, security component 204 can indicate that certificates pertaining to the site 206 are valid (or invalid), and the audio component 210 can output an audible indicia to the user to indicate that certificates pertaining to the site 206 are valid (or invalid).

Furthermore, the security component 204 may access one or more certificates pertaining to the site 206 and determine that such certificates are not valid (e.g., the site 206 may be used in connection with a man in the middle attack to maliciously receive user credentials from the user). The security component 204 may output an indication that certificates pertaining to the site 206 are not valid, and such indication can be received by a display component 118. Responsive to receiving such an indication, the display component 118 can modify the toolbar 106 to indicate to the user that the user should not provide user credentials into the entry field(s) for user credentials 202. For instance, the display component 118 can cause at least a portion of the toolbar 106 to change color. In a specific example, the display component 118 can cause at least a portion of the toolbar 106 to change to the color red. Similarly, the display component 118 can cause a graphical icon to be displayed, animation to be displayed, or an audible output to be generated to indicate to the user that the user should not provide user credentials into the entry field(s) for user credentials 202.

Furthermore, as noted above, the display component 118 can graphically display the dashboard 112 as being a visually seamless combination of the buttontab 108 and the content window 114 (which includes the entry field(s) for user credentials 202). Due to such seamless combination, a malicious hacker may find it difficult to generate a phishing attack against the user to illicitly receive user credentials. Particularly, the display component 118 can cause the dashboard 112 to be displayed in the framespace of the client application 104 and also simultaneously be displayed in a viewing area/editing area of the client application 104. Thus, the dashboard 112 can appear to extend from the framespace of the client application 104 and over a viewing/editing area of the client application. As phishing attacks are typically limited to the viewing/editing area of client applications, a malicious hacker would find it difficult to mimic the visual presentation of the dashboard 112 (the visually seamless combination of the selectable buttontab 108 and the content window 114).

Figure 3:
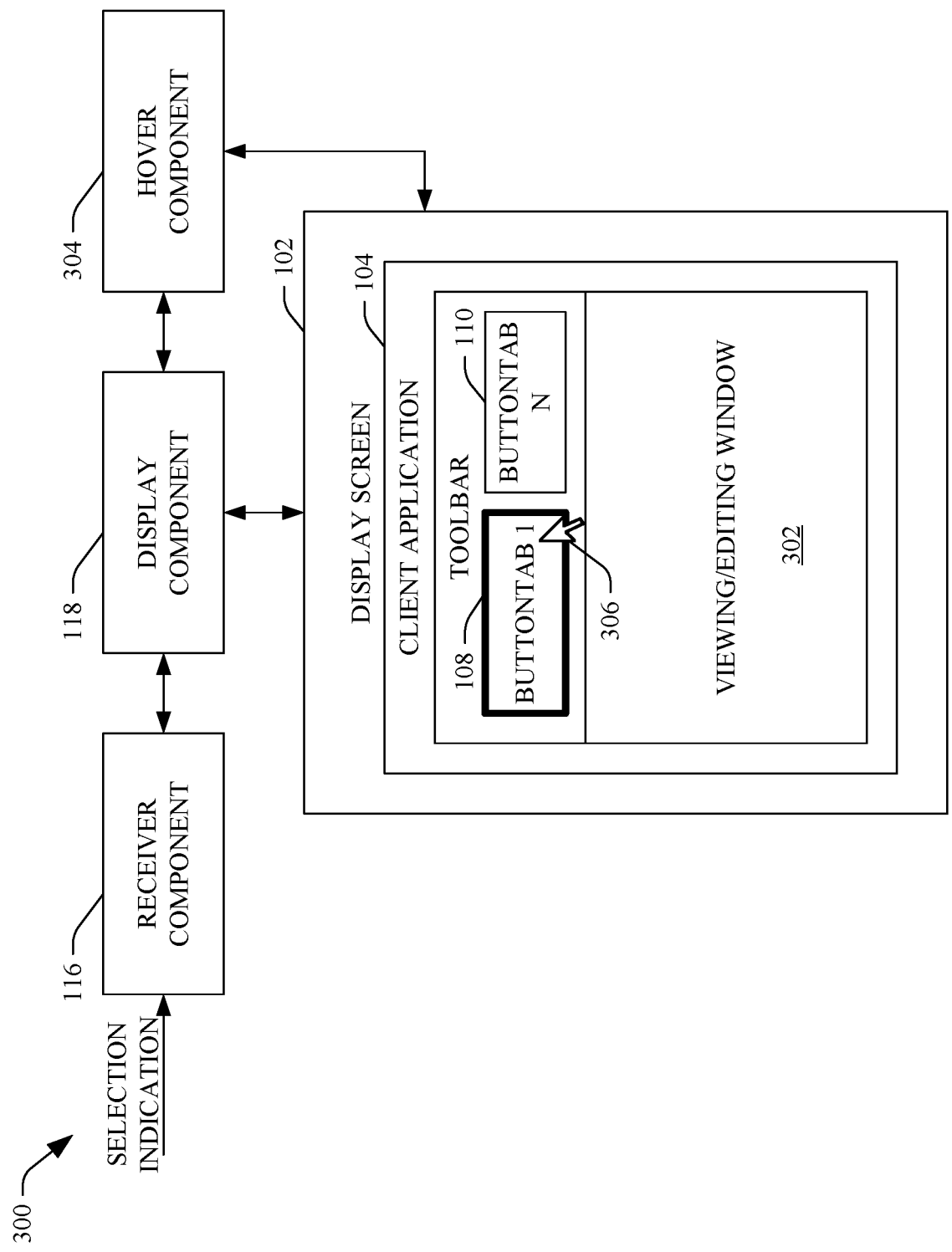
FIG. 3 is a functional block diagram of an example system that facilitates displaying a buttontab in a particular manner upon a pointing and clicking device hovering over the buttontab.

Referring now to FIG. 3, an example system 300 that facilitates displaying a buttontab in a toolbar in a particular manner depending on whether or not a user has provided valid user credentials is illustrated. The system 300 includes a display device 102 that displays the client application 104 to the user. The toolbar 106 is installed and displayed in the framespace of the client application 104. The toolbar 106 includes the buttontabs 108-110. Furthermore, the client application 106 can include a viewing/editing window 302, which can display editable and/or noneditable content to the user. For instance, if the client application 104 is an Internet browser, the viewing/editing window 302 can display content of a web page to the user. In another example, if the client application 104 is a word processing application, the viewing/editing window 302 may include content generated by the user and indicia indicating that the user can edit information shown in the viewing/editing window 302.

The system 300 additionally includes a hover component 304, wherein the hover component 304 is configured to detect that a pointing mechanism 306 such as a mouse is being hovered over the buttontab 108. The display component 118, upon receiving an indication from the hover component 304 that the pointing mechanism 306 is being hovered over the buttontab 108, can select one of at least two manners of which to display the buttontab 108 depending upon whether or not the user has provided valid user credentials to the toolbar 106. In this example, upon the hover component 304 detecting that a pointing mechanism 306 is being hovered over the buttontab 108, the display component 118 can cause the buttontab 108 to appear as a selectable button within the framespace of the toolbar 106. For instance, edges of the buttontab 108 can be displayed to the user and/or made to appear darker, in a different color, etc., such that the user can clearly determine that the pointing and clicking mechanism is being hovered over the buttontab 108 and, if the left mouse button is clicked, the buttontab 108 will be selected (and the buttontab 110 will not be selected).

Figure 4:
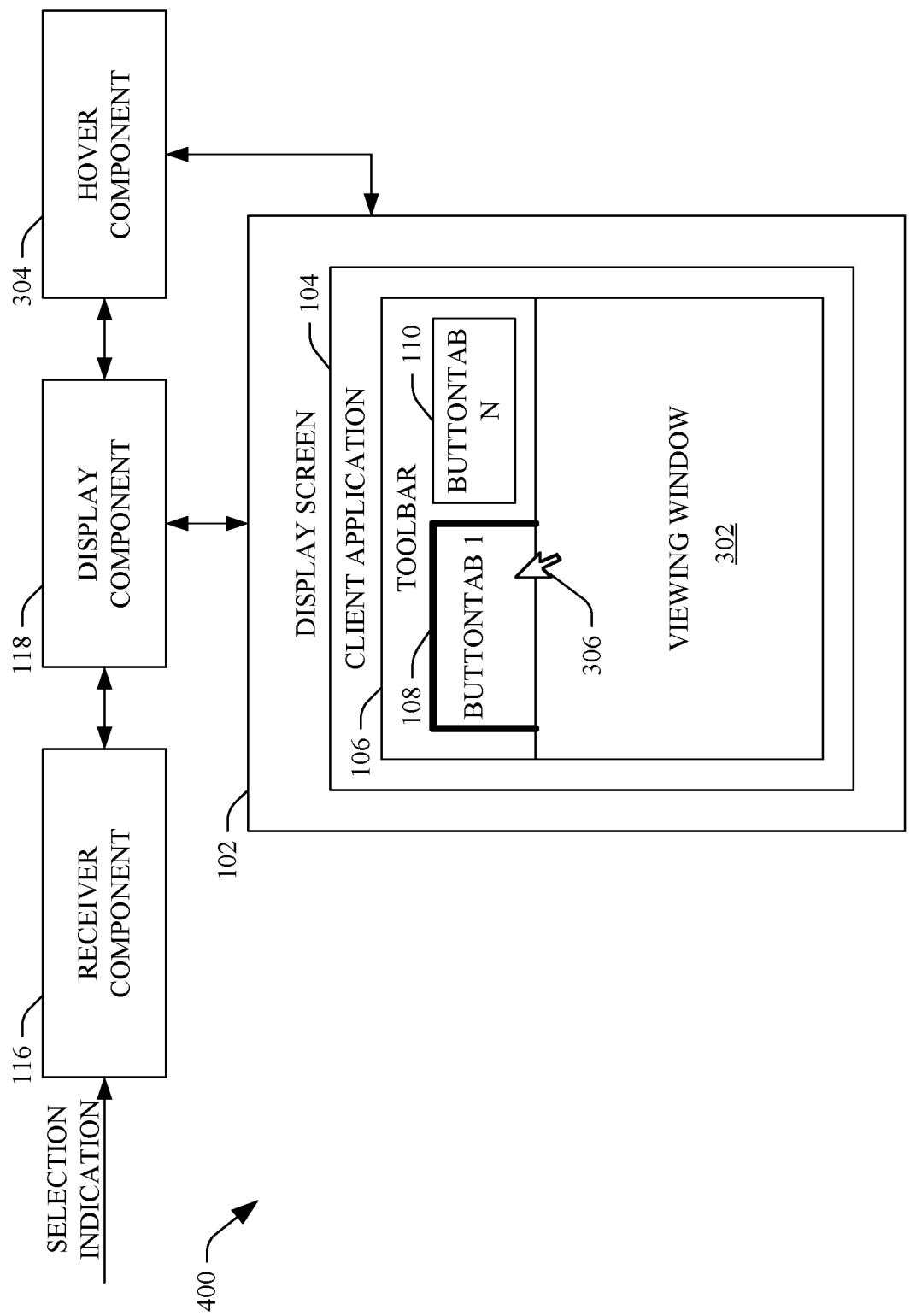
FIG. 4 is a functional block diagram of an example system that facilitates display of a buttontab in a particular manner upon a pointing and clicking mechanism being hovered over the buttontab.

Referring now to FIG. 4, an example system 400 that facilitates displaying a buttontab in a toolbar in a particular manner depending on whether or not a user has provided valid user credentials to the toolbar is illustrated. The system 400 includes the display device 102 that displays a client application 104 that includes a toolbar 106, wherein the toolbar 106 is located in the framespace of the client application 104. The toolbar 106 includes the plurality of buttontabs 108-110. Additionally, the client application 104 includes the editing/viewing window 302.

In this example, the user may have provided valid user credentials to the toolbar 106. The hover component 304 can detect that the pointing mechanism is hovering over the buttontab 108 and can output an indication of such a detection. The display component 118 can receive an indication from the hover component 304 and can cause the buttontab 108 to be displayed as a tab in the toolbar 106. For instance, the buttontab 108 can be displayed in the general shape of an upside down "U: such that sides of the buttontab 108 can intersect with a bottom edge of the toolbar 106. In this example, the bottom edge of the toolbar 106 is shown as being adjacent to the top edge of the viewing/editing window 302 of the client application 104. It is to be understood, however, that the bottom edge of the toolbar 106 may be adjacent to a top edge of another toolbar, for instance. Pursuant to an example, when the user selects the buttontab 108, a dashboard can be displayed to the user that includes content pertaining to the buttontab 108.

Figure 5:
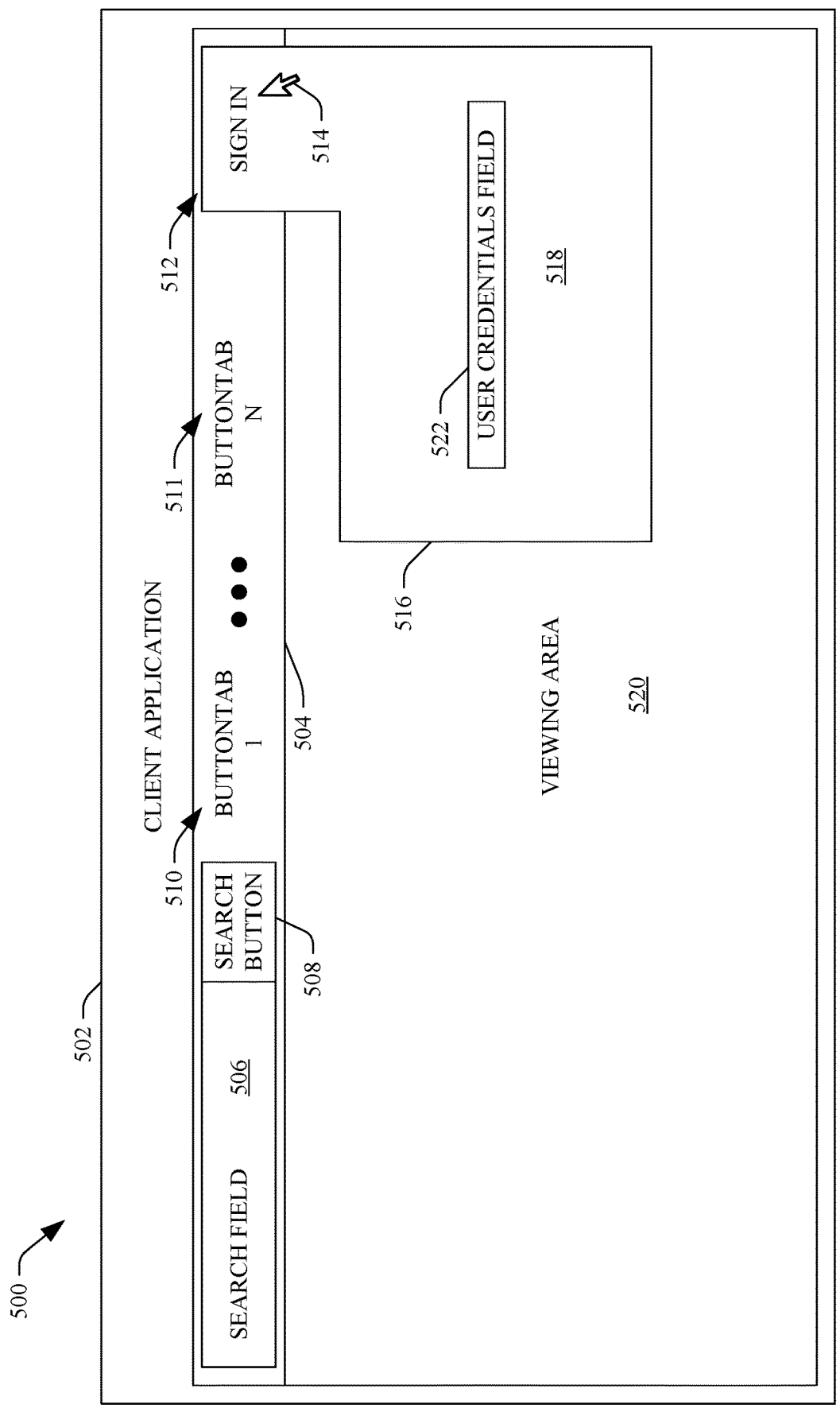
FIGS. 5-12 are example graphical user interfaces that depict a dashboard displayed in connection with a toolbar in a client application.

Referring now to FIG. 5, an example graphical user interface 500 of a toolbar found in a client application is illustrated. The graphical user interface 500 includes a graphical user interface for a client application 502. In this example, the client application may be an Internet browser. The graphical user interface 500 additionally includes a depiction of a toolbar 504, wherein the toolbar 504 can be a toolbar that may be used in connection with executing a search. Accordingly, the toolbar 504 can include a search field 506 which is configured to receive search queries from a user. The toolbar 504 can additionally include a search button 508 that, when depressed, causes a search to be undertaken based upon a query provided by the user in the search field 506. The toolbar 504 additionally includes a plurality of buttontabs 510-512. For instance, the buttontabs 510-512 can be depicted as text with no discriminating lines therebetween unless a pointing and clicking mechanism 514 is hovered over the appropriate buttontab. In another example, the buttontabs 510-512 may be depicted as graphical icons, animation and/or the like.

As depicted, one of the buttontabs 510-512 can be a buttontab configured to receive user credentials when selected by a user by way of the pointing mechanism 514. For instance, the buttontab 512 may be assigned a name that indicates to a user that, upon selection of the buttontab 512, the user will be provided with a utility for entering the user credentials.

Upon selection of the buttontab 512 through use of the pointing mechanism 514, a dashboard 516 can be presented to the user, wherein the dashboard 516 is a seamless visual combination of the buttontab 512 and a content window 518. Thus as shown in FIG. 5, a dashboard 516 is visually depicted as overlaying at least a portion of the toolbar 504 as well as at least a portion of a viewing area 520 of the client application 502. The content window 518 can include a user credential field 522 that is configured to receive credentials of a user, such as a user name and password. The content window 518 may also include a selectable button (not shown) that causes the user credentials provided by the user to be transmitted to a server for validation. Furthermore, while not shown, when the buttontab is selected by the user, at least a portion of the toolbar 504 can be subjected to a color change for instance. Similarly, a graphical icon can be presented to the user to indicate that the user can provide user credentials with confidence.

Figure 6:
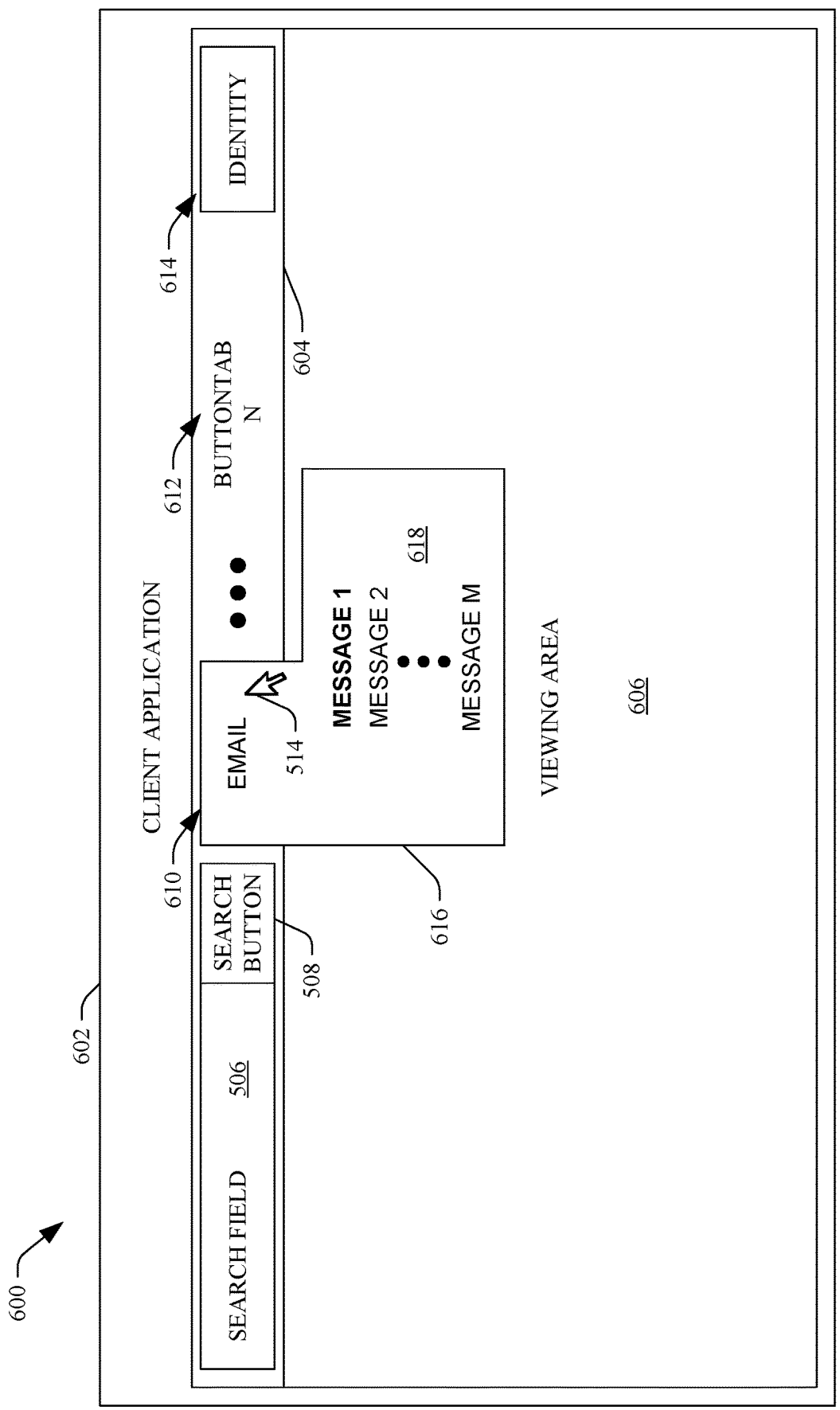

With reference now to FIG. 6, an example graphical user interface 600 is illustrated. The graphical user interface 600 depicts a client application 602. The client application 602 includes a toolbar 604 installed as an add-on/plug-in to the client application 602. The toolbar 604 can be located in the framespace of the client application 602, which is visually separated from a viewing area 606 of the client application 602. The toolbar 604 includes the search field 506 and the search button 508 which act as described above. The toolbar 604 also includes a plurality of selectable buttontabs 610-614. As shown, the buttontab 614 displays an identity of the user that has provided valid credentials to the toolbar 604. Thus, such buttontab 614 can correspond with or include an avatar that has been selected by the user.

Furthermore, the exemplary buttontab 610 pertains to e-mail of the user that has provided valid credentials to the toolbar 604. Upon selection of the buttontab 610, a dashboard 616 can be presented to the user, wherein the dashboard is a visually seamless combination of the buttontab 610 and a content window 618. Furthermore, the dashboard 616 can be shown as covering at least a portion of a toolbar 604 as well as at least a portion of the viewing area 606 of the client application 602. The content window 618 of the dashboard 616 may display at least a portion of an e-mail inbox of the user. For instance, the content window 618 can shown a threshold number of most recently received e-mail messages in the inbox of the user. Additionally, the content window 618 can depict to the user which of the e-mail messages shown in the content window 618 are unread, marked as urgent, etc. (e.g., by causing certain emails to be displayed boldly, in a certain font, displaying graphics, . . . ). Still further, the content window 618 may display, senders of e-mail messages, times that the e-mail messages were received, subject lines of e-mail messages, portions of e-mail messages, etc. Still further, the dashboard 616 can facilitate interactivity with the e-mail inbox of the user. For instance, the user may select a message in the dashboard 616 and reply to a message directly within the dashboard 616. In another example, upon selection of a message in the dashboard 616, a new browser window or browser tab can be opened that directs the user to an e-mail inbox of such user, to the selected message, etc.

Moreover, the dashboard 616 is shown as being a particular shape—however, such dashboard 616 may be any suitable shape, so long as the dashboard 616 is a visually seamless combination of the buttontab 610 and the content window 618. For instance, the content window 618 is shown as being generally square in nature, extending vertically from a first side of the buttontab 610 and extending horizontally past a second side of the buttontab 610. The content window 618, however, may be shaped as any suitable shape, and can be positioned with respect to the buttontab 610 in any suitable manner. For instance, the content window 618 may be ovular in nature. In another example, the content window 618 can be placed such that it extends horizontally from the left side of the buttontab 610 (instead of the right side of the buttontab 610 as shown in FIG. 6). Further, the content window 618 may extend horizontally in both directions from both sides of the buttontab 610. A manner in which the dashboard 616 is displayed can be based upon size of a browser window, an amount of content to be shown in the content window 618, position of the buttontab 610 in the toolbar 604, etc.

Figure 7:
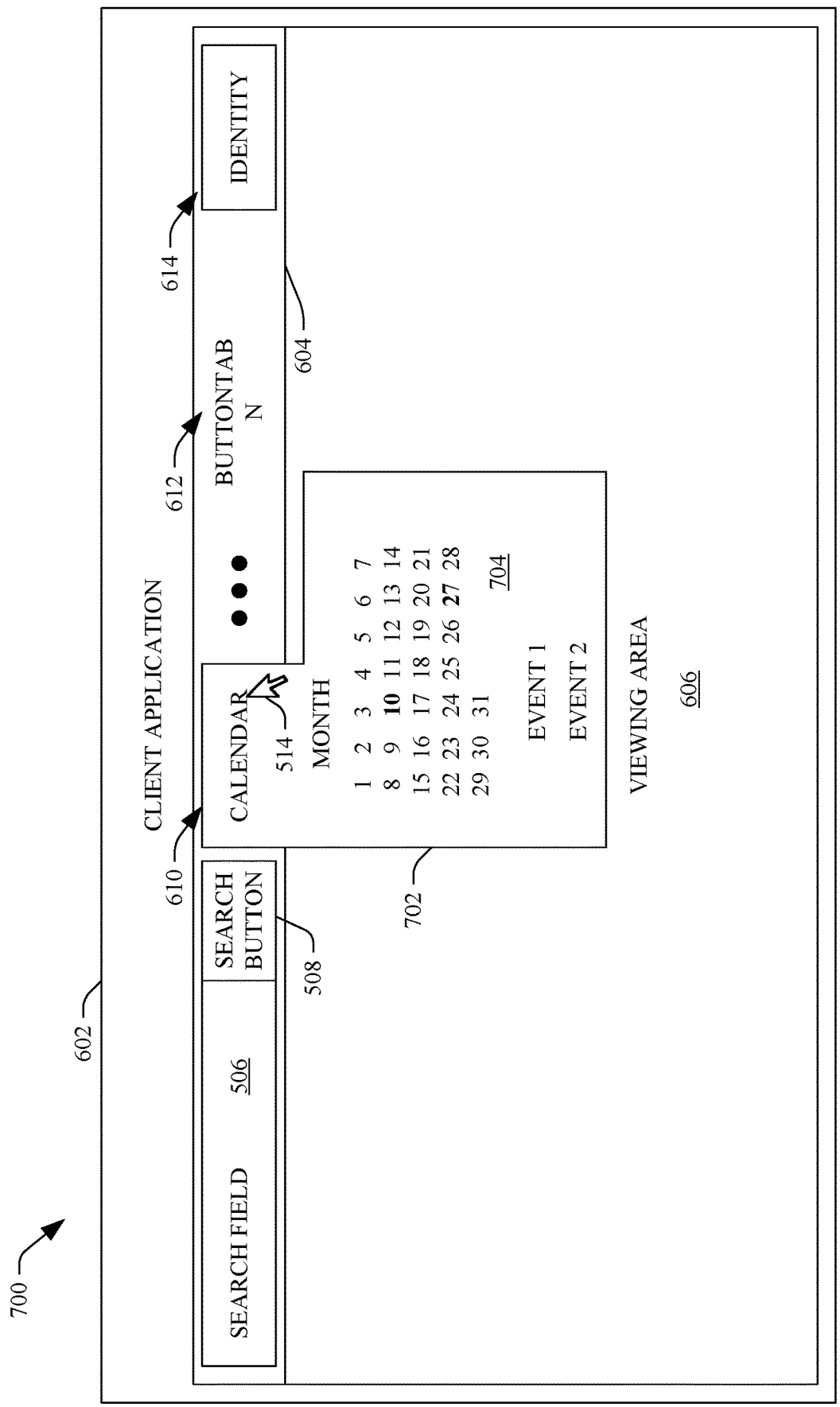

Turning now to FIG. 7, an example graphical user interface 700 is depicted. The graphical user interface 700 includes a depiction of the client application 602, the toolbar 604, the search field 506 and search button 508, and the selectable buttontabs 610-614. In this example, the selectable buttontab 610 pertains to calendar data of a user who has provided valid credentials to the toolbar 604. Thus, upon the user selecting the buttontab 610 through use of the pointing mechanism 514, calendar data pertaining to the user can be presented. Specifically, upon selection of the buttontab 610 a dashboard 702 can be graphically presented to the user, wherein the dashboard 702 is a seamless visual combination of the buttontab 610 and a content window 704. The dashboard 702 may cover at least a portion of the toolbar 604 and at least a portion of the viewing area 606 of the client application 602.

The content window 704 may include various types of calendar data. For instance, the calendar data may be a visual depiction of a month with certain dates or times highlighted, wherein the user has a calendar event occurring on such date and/or at such time. Furthermore, the content window 704 may include details pertaining to events that are calendared in a month being viewed by the user and/or within a threshold amount of time from a current time.

As before, the dashboard 702 may facilitate interactivity between the user and calendar data of such user. For instance, the user may add or delete a calendared event directly in the dashboard 702. In another example, upon selection of a date, time, event, etc. a new browser window and/or browser tab can be opened, wherein the browser window and/or browser tab can include calendar data of the user and can allow the user to edit calendar data.

Figure 8:
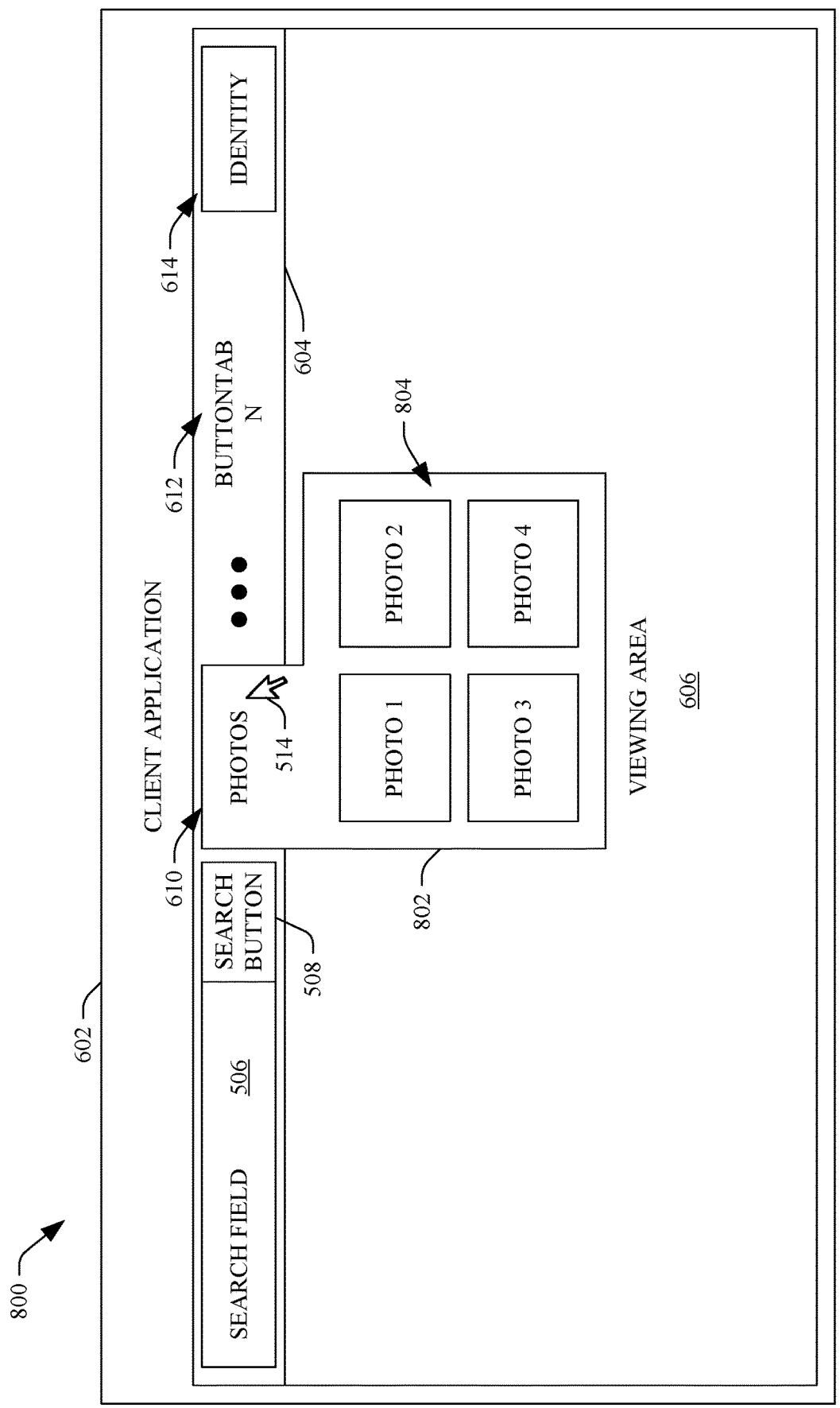

With reference now to FIG. 8, an example graphical user interface 800 is illustrated. The graphical user interface 800 includes a depiction of the client application 602 with the toolbar 604 installed therein as an add-on or plug-in. In this example, the buttontab 610 may pertain to photos of a user who has provided valid sign-in credentials and/or photos of contacts in a social network of the user. Upon selection of the buttontab 610 through use of the pointing mechanism 514, a dashboard 802 can be visually presented to the user, wherein the dashboard 802 is a visually seamless combination of the buttontab 610 and a content window 804. As described above, the dashboard 802 can cover at least a portion of the toolbar 604 as well as at least a portion of the viewing area 606 of the client application 602.

The content window 804 can include a plurality of photos, wherein the plurality of photos may be photos recently added to an online photo album of the user and/or photos added by social contacts of the user to their respective online photo albums. Thus, upon selection of the buttontab 610, the user can be presented with new photos taken by contacts of the user. Upon selection of one or more of the photos displayed in the content window 804, a new browser window or browser tab may be opened directing the user to an online photo album pertaining to a contact of a user that posted such photo. In another example, selection of one or more of the photos may cause a photo editing application to be initiated. Still further, selection of one or more of the photos may cause a photo to be enlarged within the content window 804. In still yet another example, the user may provide tags to one or more photos in the content window 804 through use of the dashboard 802. For instance, the dashboard 802 may allow for user interactivity such that the user can select one of the photos and add a tag to one or more of the photos without opening another browser window or browser tab.

Figure 9:
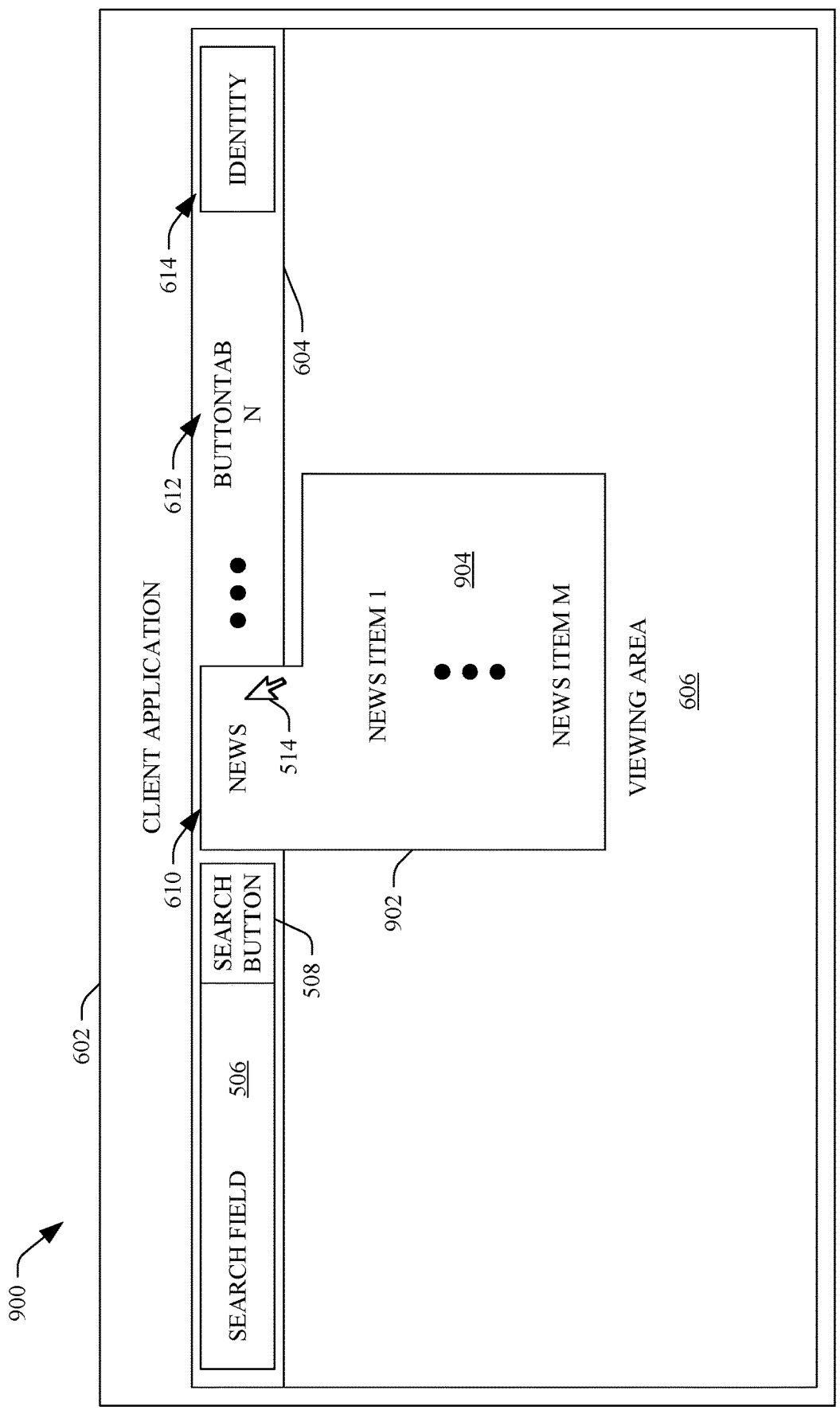

Now turning to FIG. 9, an example graphical user interface 900 is depicted. The graphical user interface 900 may include a depiction of the client application 602 and the toolbar 604 as described above. In this example, the selectable buttontab 610 may pertain to news items. Accordingly, upon the user that is signed in to the toolbar selecting the buttontab 610 by way of the pointing mechanism 514, a dashboard 902 can be presented to the user wherein the dashboard 902 is a visually seamless combination of the selectable buttontab 610 and a content window 904.

The content window 904 can display one or more current news items. For instance, the news items may pertain to a known location of a user such that the user is provided with customized news. In another example, news items presented to the user in the content window 904 may be from a user selected national news source. In still yet another example, the news items presented to the user in the content window 904 may be received from a news organization that corresponds to the toolbar 604 or known interests of the user. Upon selection of one or more of the news items depicted in the content window 904, a new browser window or browser tab can be opened, and the selected story can be presented to the user in the new browser window or tab. In another example, a selected news item may be shown in more detail directly in the content window 904 of the dashboard 902. Thus, the user may have an ability to read a news story without being required to open a new browser window or browser tab. The news items depicted in the content window 904 may be displayed in any suitable manner. For instance, news items may be ranked by perceived relevance to user interests. In another example, the news items presented may be headlines, headlines together with a news summary, abstracts, etc.

Figure 10:
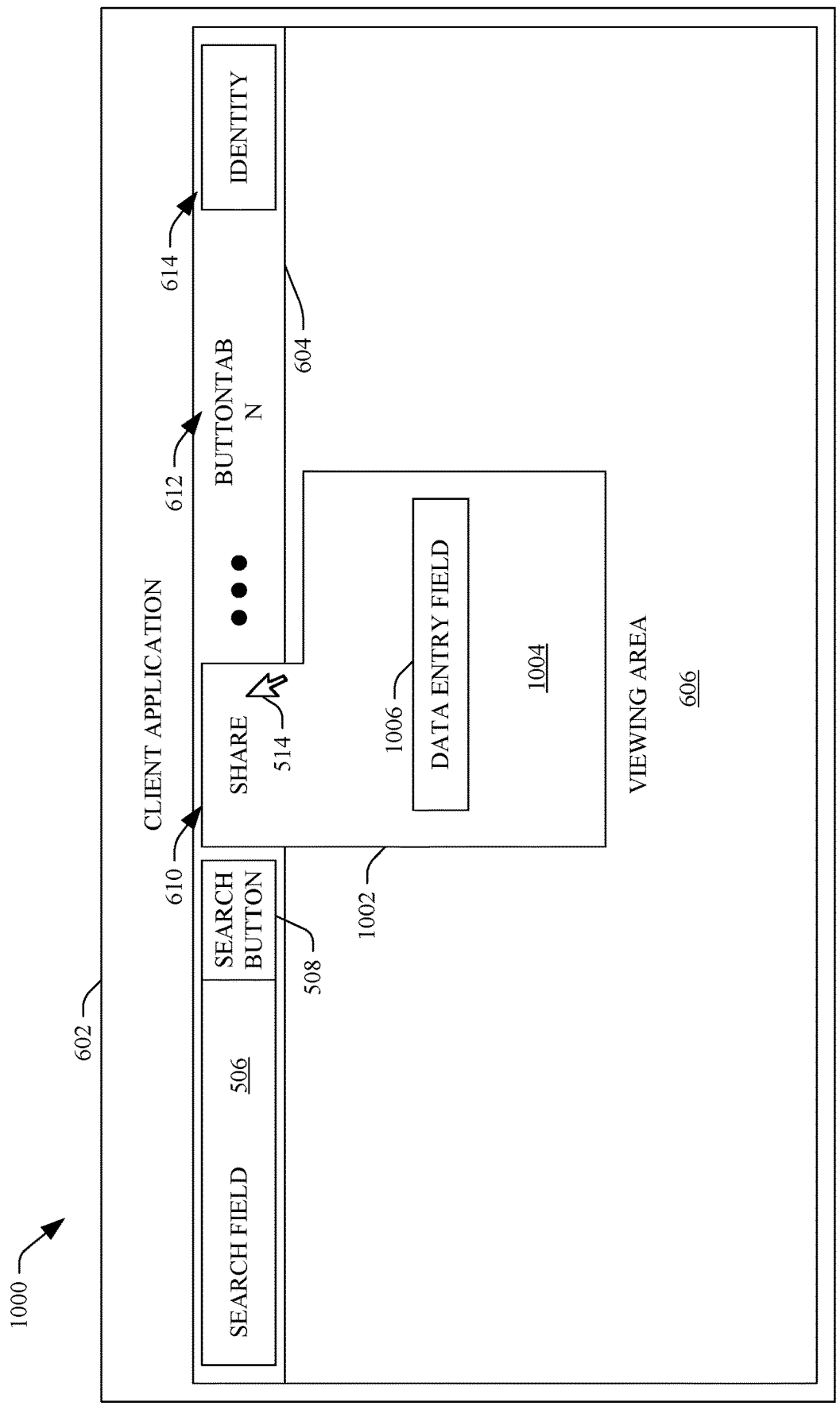

Referring now to FIG. 10, an example graphical user interface 1000 is illustrated. In this example, the selectable buttontab 610 pertains to causing data to be shared with contacts of the user (e.g., contacts within the social network of the user). Upon selection of the buttontab 610 through use of the pointing mechanism 514, a dashboard 1002 can be visually presented to the user, wherein the dashboard 1002 is a visually seamless combination of the selectable buttontab 610 and a content window 1004. Thus, visually it can appear to the user that the buttontab 610 expands to show data pertaining to the buttontab. In this example, the content window 1004 may include a data entry field 1006. Pursuant to an example, the data entry field 1006 may be automatically populated with a URL of a web site that is currently being viewed through use of the client application 602. Thereafter, the user may cause such URL to be uploaded to a server such that members of the user's social network can quickly ascertain which site the user would like to share with his/her social contacts. In other examples, the user may provide other data in the data entry field. For instance, the user may select a file on the client computing device to upload to the server to a site that is accessible by one or more contacts of the user. Further, the user may provide a description of comments pertaining to data placed in the data entry field (e.g., comments pertaining to a certain file, a URL, . . . ).

Figure 11:
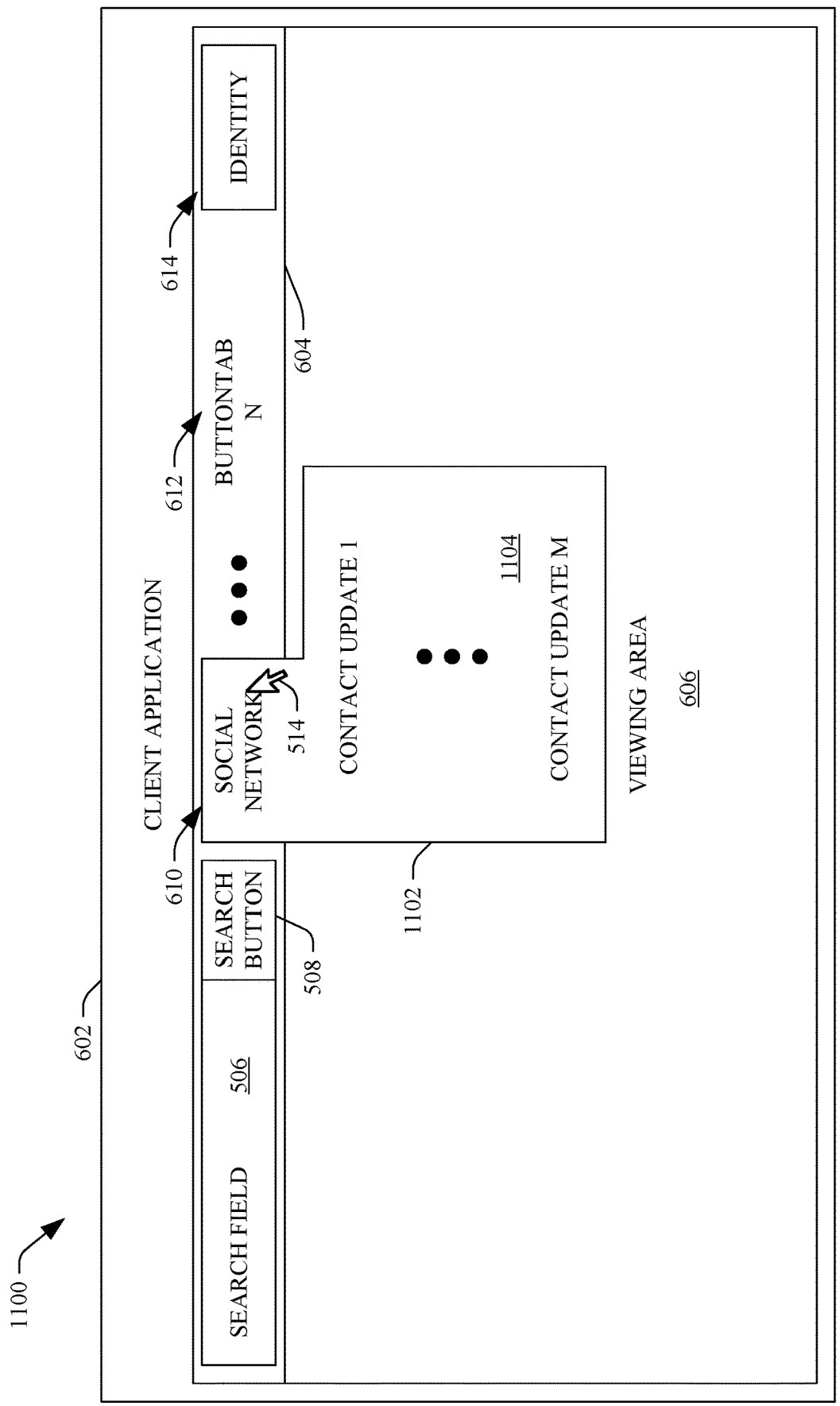

Referring now to FIG. 11, an example graphical user interface 1100 is illustrated. As before, the graphical user interface 1100 includes a depiction of the client application 602 and the toolbar 604 installed therein. In the example depicted in FIG. 11, the selectable buttontab 610 pertains to a social network of the user. More particularly, the buttontab 610 can be used in connection with providing the user with updates of contacts of the user. Upon selection of the buttontab 610 through use of the pointing mechanism 514, a dashboard 1102 can be presented to the user, wherein the dashboard 1102 is a visually seamless combination of the buttontab 610 and a content window 1104. As before, the dashboard 1102 can cover at least a portion of the toolbar 604 as well as at least a portion of the viewing area 606 of the client application 602.

The content window 1104 can display updates of one or more social contacts of the user. For instance, a social contact of the user may change their status (e.g., from online to offline). In another example, a social contact of the user may change an avatar corresponding thereto, may alter a current mood, may add one or more files to their social networking home page, may modify their user profile, etc. Thus, the user who has provided valid credentials to the toolbar 604 can quickly view updates pertaining to the social network of the user. Upon selection of one or more updates displayed in the content window 1104, a new browser window or browser tab can be opened that directs the user to the social networking page of the contact that corresponds to the update. In another example, upon selection of the contact update in the content window 1104, an instant messaging application may be initiated and an instant messaging conversation window between the user and the contact may be presented to the user. Other functionality upon selecting a contact update in the content window 1104 is contemplated by the inventors and is intended to fall under the scope of the hereto-appended claims.

Figure 12:
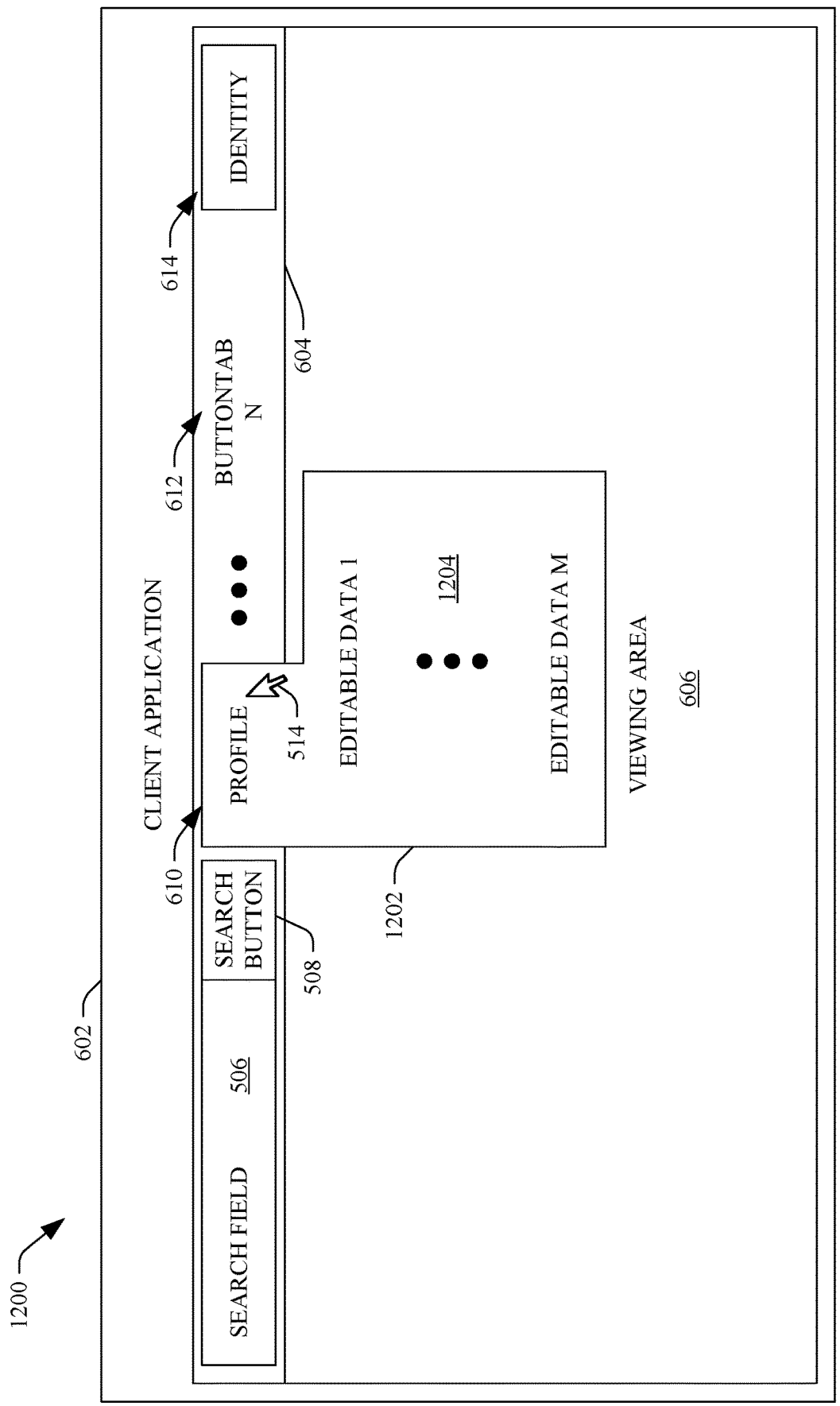

Referring now to FIG. 12, an example graphical user interface 1200 is shown. The graphical user interface 1200 depicts the client application 602 with the toolbar 604 installed therein. In this example, the selectable buttontab 610 may pertain to a profile of a user (e.g., a social networking profile) who has provided valid sign-in credentials to the toolbar 604. Upon selection of the buttontab 610 through use of the pointing mechanism 514, a dashboard 1202 can be presented to the user, wherein the dashboard 1202 is a visually seamless combination of the selectable buttontab 610 and a content window 1204. The content window 1204 may include editable profile data of the user. For instance, such editable data may include a blog entry, an avatar, a current status of the user, etc. Thus, the user may alter their social networking status without having to open a new browser window/tab that is directed to a social networking home page of the user.

While the dashboards shown in FIGS. 5-12 are shown at certain positions in the toolbar 604, it is to be understood that each of the buttontabs described herein may be simultaneously depicted in the toolbar 604 at any suitable location or order. Furthermore, buttontabs pertaining to other data may also be displayed at any suitable location and in any suitable order in the toolbar 604. For instance, another buttontab may pertain to a user's instant messaging contacts, wherein selection of the buttontab may cause each online contact (e.g., each contact logged into an instant messaging application) of the user to be displayed. Thereafter, an instant messaging conversation can be initiated within the dashboard presented upon selection of the buttontab.

Moreover, a maintainer of the toolbar 604 can remotely add buttons to the toolbar 604, such that certain markets/regions have particular buttontabs displayed thereon. In another example, a maintainer of the toolbar 604 can remotely change order of buttontabs for a particular market/region. Such changing of buttontabs and/or changing of an order of display of buttontabs can be undertaken, for instance, by way of an RSS feed. Other mechanisms are also contemplated, however.

Figure 13:
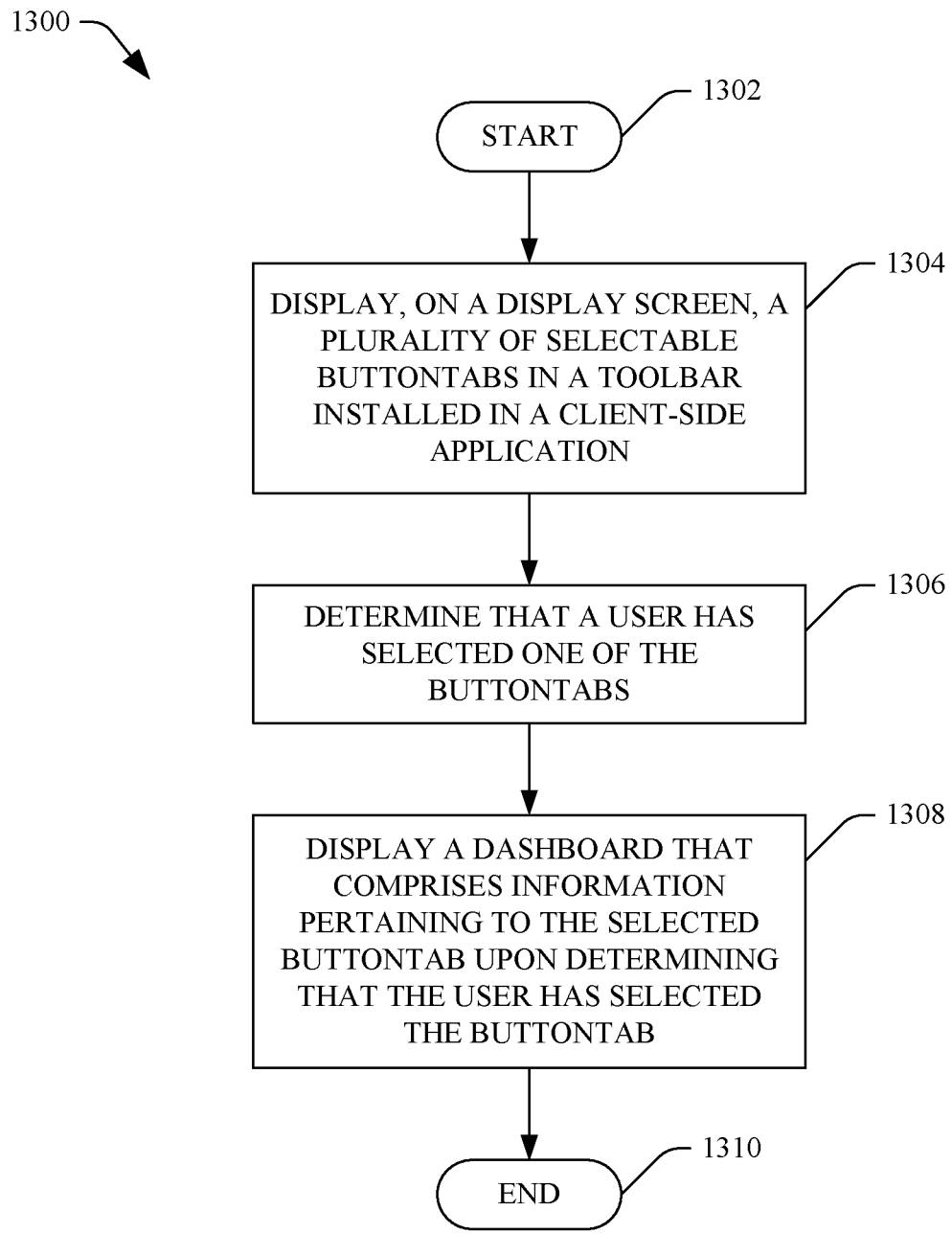
FIG. 13 is flow diagram that illustrates an example methodology for displaying a dashboard from a toolbar in a client side application.
Figure 14:
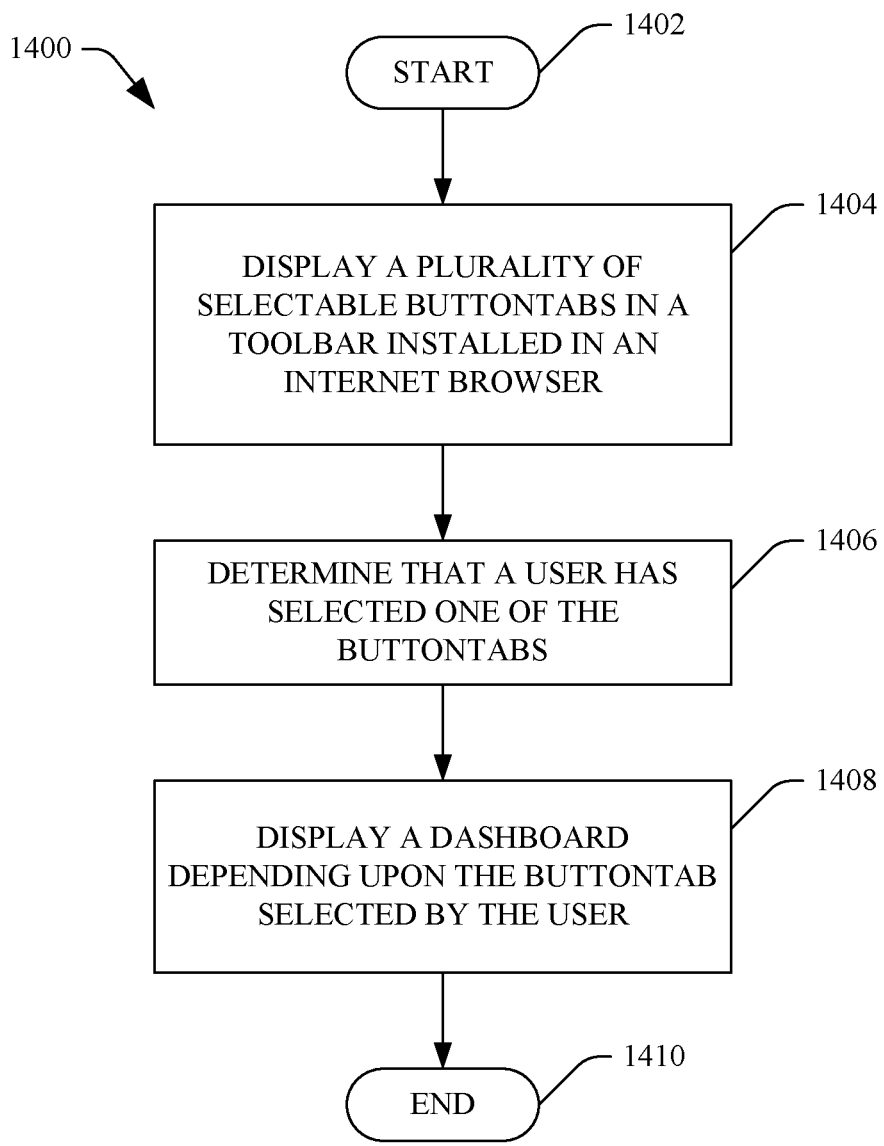
FIG. 14 is a flow diagram that illustrates an example methodology for displaying a dashboard in a certain manner depending on a buttontab selected by a user.

With reference now to FIGS. 13-14, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 13, a methodology 1300 that facilitates displaying a dashboard on a display device is illustrated. The methodology 1300 begins at 1302, and at 1304 a plurality of selectable buttontabs in a toolbar installed in a client side application are displayed on a display screen of a client computing device. As noted above, the toolbar may be placed in a framespace of the client side application, wherein the client side application may be an Internet browser, a word processing application, etc.

At 1306, it is determined that a user has selected one of the selectable buttontabs displayed in the toolbar in the client side application. As noted above, the selectable buttontabs may pertain to e-mail of the user, calendar data of the user, social network of the user, photographs of the user, or of contacts of the user, etc.

At 1308, a dashboard is displayed that comprises information pertaining to the selectable buttontab, wherein the dashboard is displayed upon determining that the user has selected the selectable buttontab. As discussed previously, the dashboard can be a visually seamless combination of the selected buttontab and a content window. Furthermore, the dashboard can be graphically depicted as overlaying at least a portion of the toolbar as well as at least a portion of a viewing/editing window of the client application. The methodology 1300 completes at 1310.

Referring now to FIG. 14, a methodology 1400 that facilitates displaying a dashboard in a toolbar installed in a client application is illustrated. The methodology 1400 starts at 1402, and at 1404 a plurality of selectable buttontabs in a toolbar installed in an Internet browser are displayed. For instance, the toolbar can be downloaded by way of the Internet and added to the Internet browser as an add-on or plug-in. Furthermore, the plurality of selectable buttontabs can include a first buttontab that pertains to e-mail of a user, a second buttontab that pertains to a calendar of the user, a third buttontab that pertains to a social network of the user, a fourth buttontab that pertains to a profile of the user, a fifth buttontab that pertains to news items, and a sixth buttontab that pertains to uploading data to a server.

At 1406, it is determined that the user has selected one of the selectable buttontabs. At 1408 a dashboard is displayed depending upon which of the selectable buttontabs was selected by the user. The dashboard can be visually depicted as a seamless visual combination of the selected buttontab and a content window wherein the dashboard is at least partially displayed over at least a portion of the toolbar and at least a portion of a viewing area of the Internet browser.

If the first selectable buttontab is selected, the displayed dashboard can include at least a portion of an e-mail inbox of the user. If the second selectable buttontab is selected, the displayed dashboard can include calendar data of the user. If the third selectable buttontab is selected, the displayed dashboard can include data pertaining to social contacts of the user. If the fourth selectable buttontab is selected, the displayed dashboard can include profile data of the user. If the fifth selectable buttontab is selected, the displayed dashboard can include at least one news item, and if the sixth selectable buttontab is selected, the displayed dashboard can include a data entry field for uploading data to the server. The methodology 1400 completes at 1410.

Figure 15:
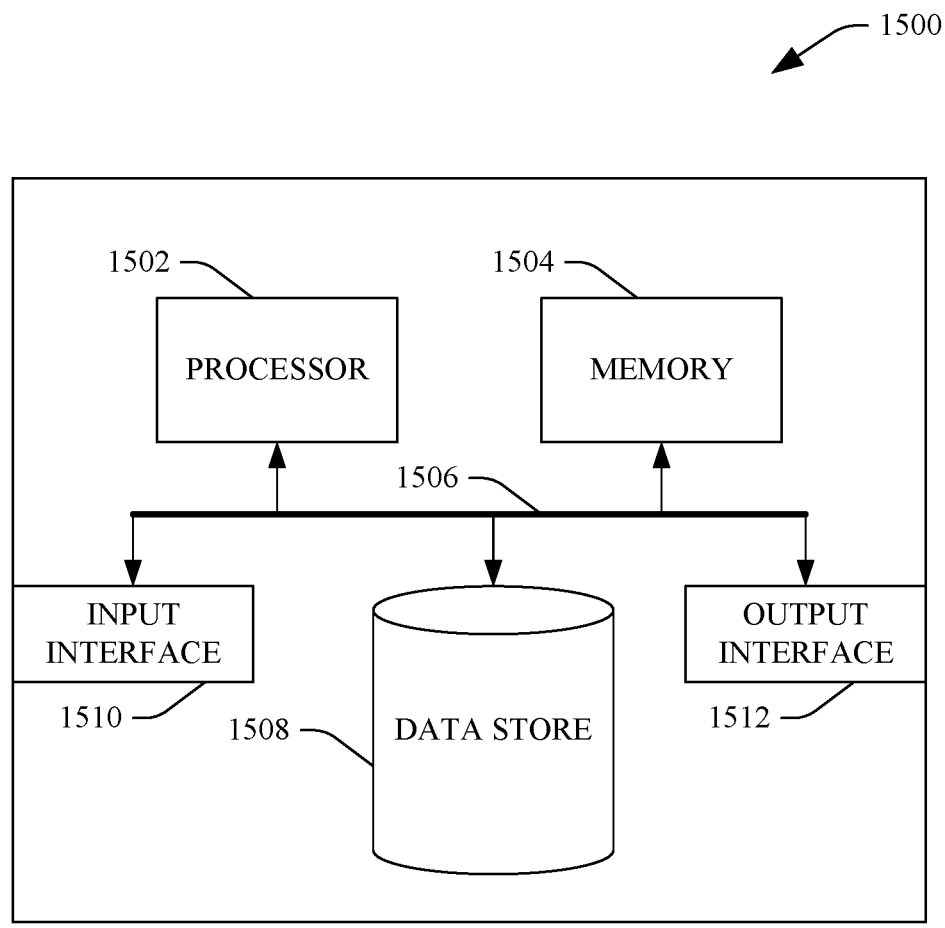
FIG. 15 is an example computing system.

Now referring to FIG. 15, a high-level illustration of an example computing device 1500 that can be used in accordance with the systems and methodologies disclosed herein is illustrated. For instance, the computing device 1500 may be used in a system that supports displaying dashboards to a user. In another example, at least a portion of the computing device 1500 may be used in a system that supports downloading and installing a toolbar into a client application. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory 1504 by way of a system bus 1506. In addition to storing executable instructions, the memory 1504 may also store e-mail data of the user, calendar data of the user, social contact information of the user, etc.

The computing device 1500 additionally includes a data store 1508 that is accessible by the processor 1502 by way of the system bus 1506. The data store 1508 may include executable instructions, e-mail data of the user, social contact information of the user, photographs, etc. The computing device 1500 also includes an input interface 1510 that allows external devices to communicate with the computing device 1500. For instance, the input interface 1510 may be used to receive instructions from an external computing device, from a user through use of a dashboard, etc. The computing device 1500 also includes an output interface 1512 that interfaces the computing device 1500 with one or more external devices. For example, the computing device 1500 may display text, images, etc. by way of the output interface 1512.

Additionally, while illustrated as a single system, it is to be understood that the computing device 1500 may be a distributed system. Thus, for instance, several devices may be in communication by way of a network connection and may collectively perform tasks described as being performed by the computing device 1500.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computing system comprising:
a processor;
a display; and
memory storing instructions that, when executed by the processor, cause the processor to perform acts comprising:
receiving, from a user of the computing system, a selection of a button residing in a framespace of a web browser being executed by the processor, the web browser displayed on the display, the button corresponding to a social networking application; and
when the web browser is not in possession of credentials of the user:
responsive to receiving the selection of the button, displaying a graphical object on the display, the graphical object partially overlaying a viewing region of the web browser, the graphical object comprising a user credentials field;
receiving, at the user credentials field, the credentials of the user from the user, wherein the social networking application authenticates the user based upon the received credentials; and
responsive to the social networking application authenticating the user, displaying a data entry field within the graphical object displayed on the display while removing the user credentials field from the graphical object, the data entry field configured to receive user data that is to be shared with contacts of the user via the social networking application.

2. The computing system of claim 1, the acts further comprising:
when the web browser is in possession of the credentials of the user:
responsive to receiving the selection of the button, causing the user to be authenticated based upon the credentials of the user; and
responsive to causing the user to be authenticated, displaying the data entry field on the display.

3. The computing system of claim 1, the acts further comprising:
receiving, at the data entry field, the user data; and
causing the user data to be shared with the contacts of the user via the social networking application.

4. The computing system of claim 1, wherein the graphical object is a visually seamless combination of a graphical portion and a content window, the graphical portion extending from the button, the content window comprising the user credentials field prior to the user being authenticated, the content window comprising the data entry field subsequent to the user being authenticated.

5. The computing system of claim 1, the acts further comprising:
transmitting the credentials of the user to a server that executes the social networking application; and
receiving an indication from the server that the credentials of the user have been validated.

6. The computing system of claim 1, wherein the data entry field is comprised by a second graphical object displayed on the display, the second graphical object partially overlaying the viewing region of the web browser, the second graphical object further comprising a second button that resides in the framespace of the web browser.

7. The computing system of claim 1, the acts further comprising:
subsequent to receiving the selection of the button and prior to displaying the graphical object on the display, determining whether the web browser is in possession of the credentials of the user.

8. The computing system of claim 1, the acts further comprising:
prior to receiving the credentials of the user, accessing a certificate of a site that is to receive the credentials of the user;
when the certificate of the site is determined to be valid, causing first graphical indicia to be presented on the display, the first graphical indicia indicating that the certificate is valid; and
when the certificate of the site is determined not to be valid, causing second graphical indicia to be presented on the display, the second graphical indicia indicating that the certificate is not valid.

9. The computing system of claim 1, wherein the button is comprised by a toolbar that is displayed on the display within the framespace of the web browser.

10. The computing system of claim 9, wherein the toolbar is displayed in a first color prior to receiving the selection of the button, the acts further comprising:

responsive to receiving the selection of the button, displaying at least a portion of the toolbar in a second color.

11. A method executed by a processor of a computing device, the method comprising:
receiving, from a user of the computing device, a selection of a button residing in a framespace of a web browser being executed by the processor, the web browser displayed on a display, the button corresponding to a social networking application; and
when the web browser is not in possession of credentials of the user:
based upon the selection of the button, displaying a graphical object on the display, the graphical object partially overlaying a viewing region of the web browser, the graphical object comprising a user credentials field;
causing the user to be authenticated based upon credentials of the user received in the user credentials field; and
upon the user being authenticated, displaying a data entry field within the graphical object displayed on the display while removing the user credentials field from the graphical object, wherein user data received by way of the data entry field is shared with contacts of the user via the social networking application.

12. The method of claim 11, further comprising:
when the web browser is in possession of the credentials of the user:
responsive to receiving the selection of the button, causing the user to be authenticated based upon the credentials of the user; and
responsive to causing the user to be authenticated, displaying the data entry field on the display.

13. The method of claim 11, wherein the graphical object is a visually seamless combination of a graphical portion and a content window, the graphical portion extending from the button, wherein the content window comprises the user credentials field prior to the user being authenticated, wherein the content window comprises the data entry field subsequent to the user being authenticated.

14. The method of claim 11, wherein the button visually indicates that the user is to provide credentials for the user to the user credentials field.

15. The method of claim 11, wherein the button is displayed as a buttontab residing in the framespace prior to receiving the selection of the button, the acts further comprising:
prior to receiving the selection of the button, detecting that a pointing mechanism is being hovered over the buttontab; and
responsive to detecting that the pointing mechanism is being hovered over the buttontab, causing the buttontab to appear as the button.

16. The method of claim 11, wherein causing the user to be authenticated based upon the credentials of the user comprises:
transmitting the credentials of the user to a server, wherein the server validates the credentials of the user; and
receiving an indication from the server that the credentials of the user have been validated.

17. The method of claim 16, wherein the graphical object further comprises a second button, wherein transmitting the credentials of the user to the server occurs responsive to receiving a selection of the second button by the user.

18. The method of claim 11, wherein the user data is a uniform resource locator (URL) of a web page.

19. A computer-readable storage device comprising instructions that, when executed by a processor, cause the processor to perform acts comprising:
receiving, from a user of the computer-readable storage device, a selection of a button residing in a framespace of a web browser being executed by the processor, the web browser displayed on a display, the button corresponding to a social networking application;
when the web browser is not in possession of credentials of the user:
responsive to receiving the selection of the button, displaying a graphical object on the display, the graphical object partially overlaying a viewing region of the web browser, the graphical object comprising a user credentials field;
responsive to receiving, at the user credentials field, the credentials of the user from the user, causing the user to be authenticated based upon the credentials of the user; and
responsive to causing the user to be authenticated, displaying a data entry field within the graphical object displayed on the display while removing the user credentials field from the graphical object, the data entry field configured to receive user data that is to be shared with contacts of the user via the social networking application; and
when the web browser is in possession of the credentials of the user:
responsive to receiving the selection of the button, causing the user to be authenticated based upon the credentials of the user; and
responsive to causing the user to be authenticated, displaying the graphical object on the display, the graphical object comprising the data entry field.

20. The computing system of claim 1, wherein the graphical object extends from the button and partially overlays both the framespace of the web browser and the viewing region of the web browser.

* * * * *